(12) United States Patent
Meyer et al.

(10) Patent No.: US 9,090,284 B2
(45) Date of Patent: Jul. 28, 2015

(54) STEERING COLUMN FOR A MOTOR VEHICLE

(71) Applicants: Martin Meyer, Walzenhausen (CH); Sebastian Huber, Goefis (AT)

(72) Inventors: Martin Meyer, Walzenhausen (CH); Sebastian Huber, Goefis (AT)

(73) Assignee: ThyssenKrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 14/383,196

(22) PCT Filed: Feb. 14, 2013

(86) PCT No.: PCT/EP2013/000431
§ 371 (c)(1),
(2) Date: Sep. 5, 2014

(87) PCT Pub. No.: WO2013/131608
PCT Pub. Date: Sep. 12, 2013

(65) Prior Publication Data
US 2015/0028574 A1    Jan. 29, 2015

(30) Foreign Application Priority Data
Mar. 6, 2012    (AT) .................................. A 285/2012

(51) Int. Cl.
*B62D 1/181*    (2006.01)
*B62D 7/22*    (2006.01)
*F16F 15/02*    (2006.01)

(52) U.S. Cl.
CPC ............... *B62D 7/224* (2013.01); *B62D 1/181* (2013.01); *F16F 15/021* (2013.01)

(58) Field of Classification Search
CPC ........................................................ B62D 1/181
USPC ............................................. 280/775; 74/493
See application file for complete search history.

(56) References Cited

U.S. PATENT DOCUMENTS 3,546,504 A * 12/1970 Bottle et al. .................... 310/51
5,521,447 A * 5/1996 Bertolini et al. ................ 310/51
(Continued)

FOREIGN PATENT DOCUMENTS

DE    102007039361 A1    5/2008
DE    102006036183 B4    2/2011
(Continued)

OTHER PUBLICATIONS

German Language International Search Report for International patent application No. PCT/EP2013/000431; mailing date May 8, 2013.
(Continued)

*Primary Examiner* — Ruth Ilan
(74) *Attorney, Agent, or Firm* — ThyssenKrupp North America, Inc.

(57) ABSTRACT

The invention relates to a steering column for a motor vehicle, which steering column can be displaced in at least one displacement direction, which comprises, for the purpose of displacement in the displacement direction or in at least one of the displacement directions, a spindle drive driven by a drive motor, which spindle drive has a threaded spindle extending in an axial direction. The drive motor is connected to a part of the steering column, which carries the drive motor, via a damping unit that has a primary connecting part having a first contact surface and a secondary connecting part having a second contact surface, wherein the first and the second contact surface are spaced apart from each other in the axial direction of the threaded spindle, and an elastomer or viscoelastic damping material is arranged between the first and the second contact surfaces.

16 Claims, 3 Drawing Sheets

(56) References Cited

U.S. PATENT DOCUMENTS

| | | | |
|---|---|---|---|
| 5,772,244 A * | 6/1998 | Park | 280/780 |
| 2006/0134450 A1 * | 6/2006 | Sigler et al. | 428/621 |
| 2009/0064814 A1 | 3/2009 | Tanaka | |
| 2009/0308189 A1 * | 12/2009 | Tomaru et al. | 74/89.42 |
| 2011/0247891 A1 * | 10/2011 | Meyer et al. | 180/443 |
| 2011/0314954 A1 * | 12/2011 | Matsuno et al. | 74/493 |
| 2012/0180594 A1 * | 7/2012 | Park | 74/493 |

FOREIGN PATENT DOCUMENTS

| | | | |
|---|---|---|---|
| DE | 102009057388 A1 | 5/2011 | |
| EP | 1486395 B1 | 12/2004 | |
| WO | 2010069434 A1 | 6/2010 | |

OTHER PUBLICATIONS

English Translation of International Search Report for International patent application No. PCT/EP2013/000431; mailing date May 8, 2013.

English Abstract of German patent No. DE102007039361A1.

English Abstract of German patent No. DE102006036183B4.

English Abstract of German patent No. DE102009057388A1.

* cited by examiner

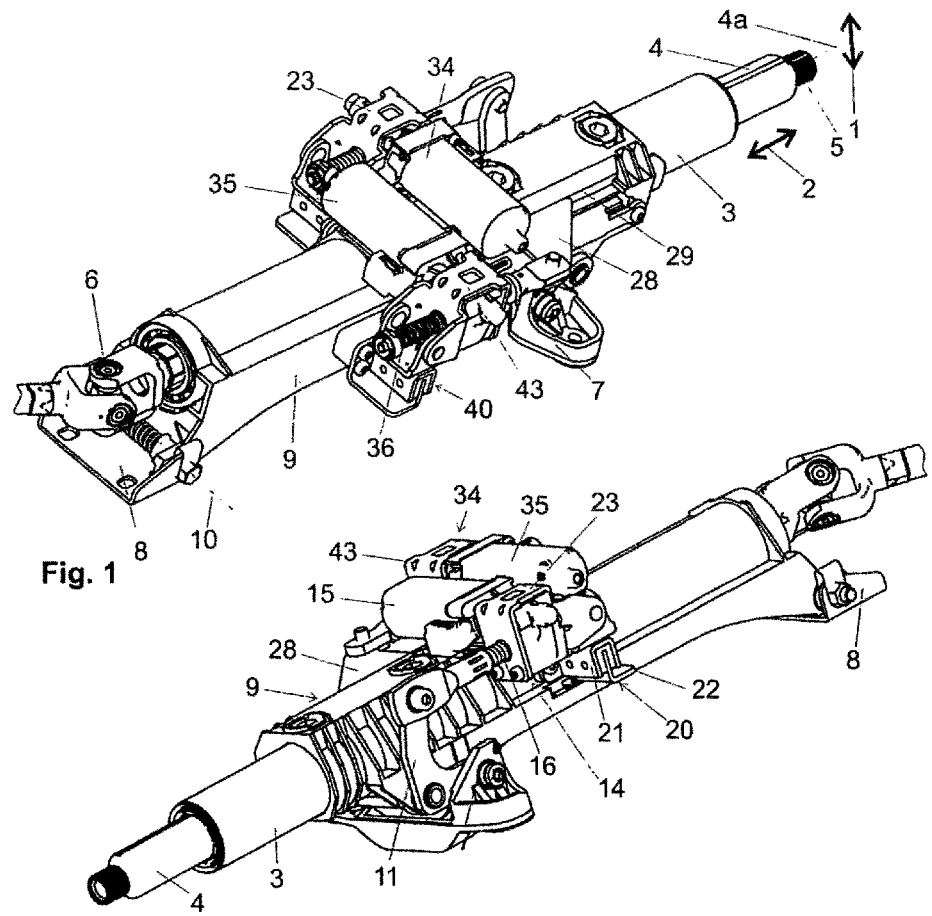
Fig. 1
Fig. 2
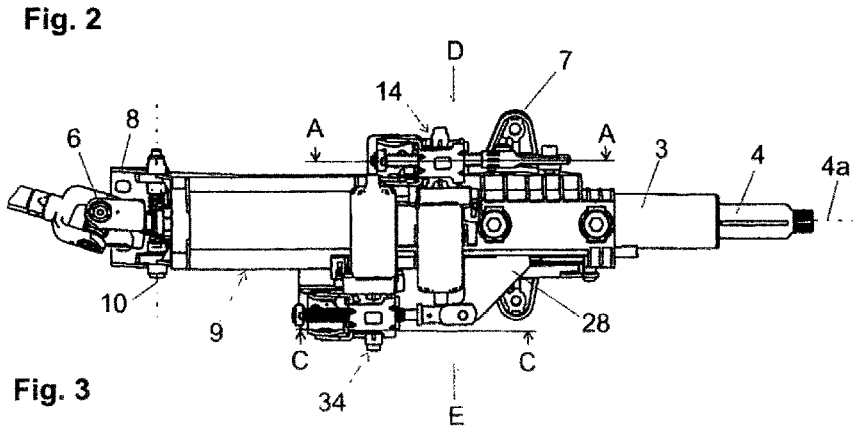
Fig. 3

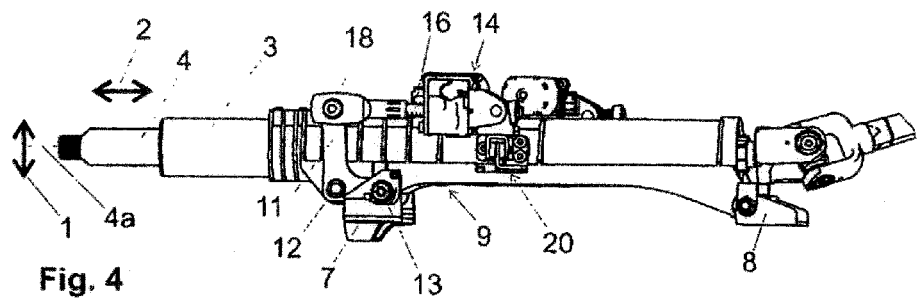
Fig. 4
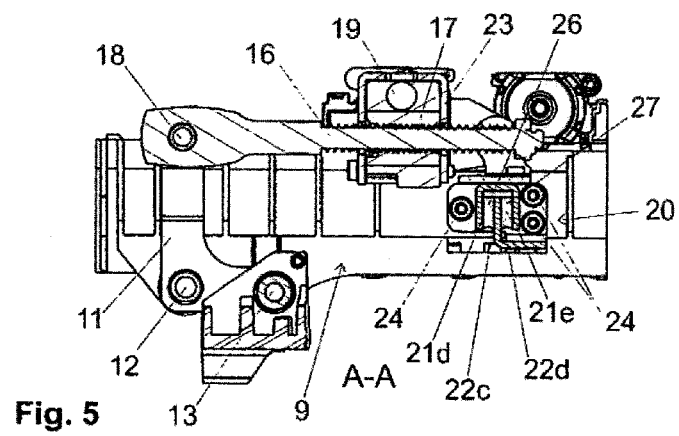
Fig. 5
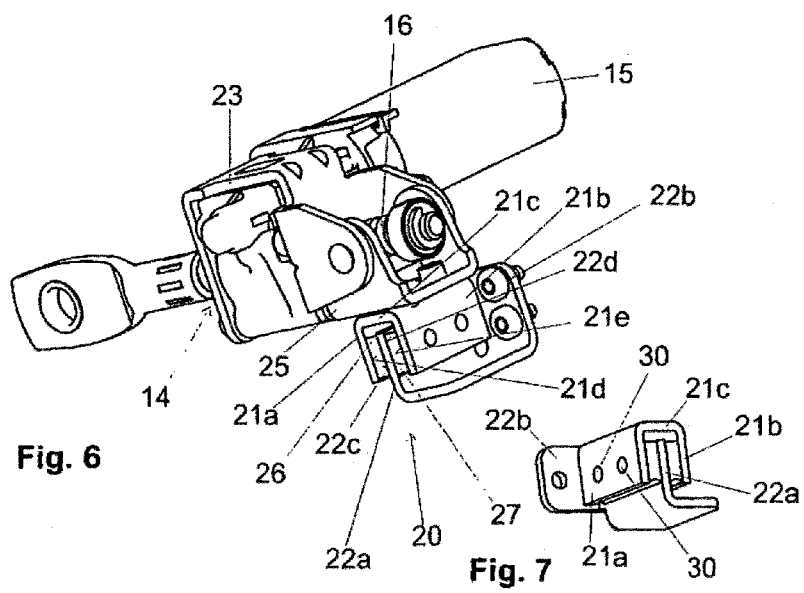
Fig. 6
Fig. 7

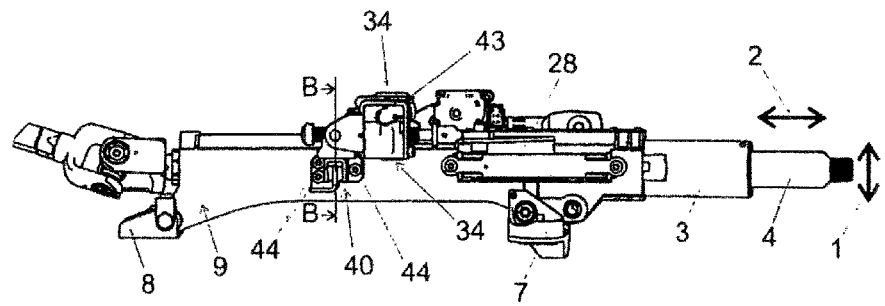
Fig. 8
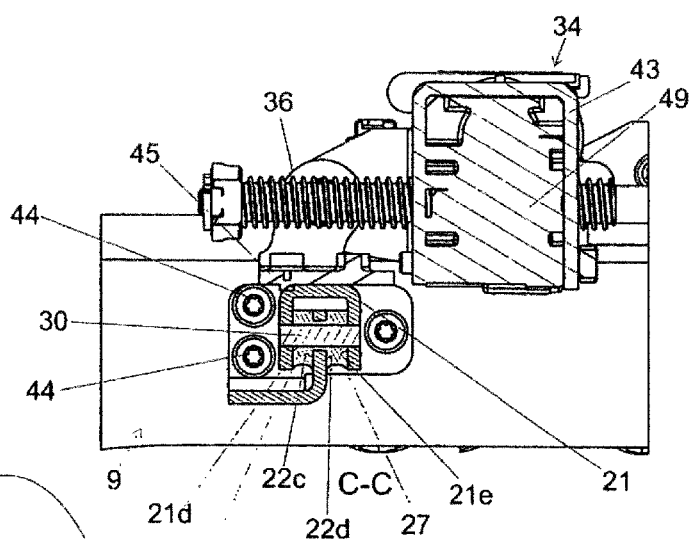
Fig. 9
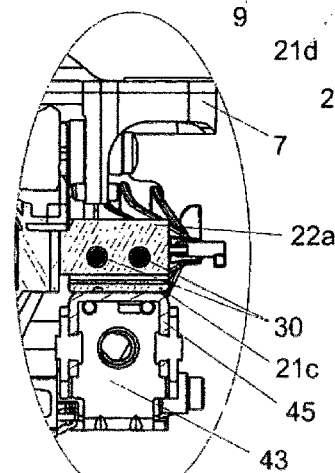
Fig. 10 B-B
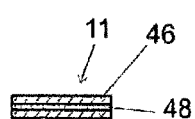
Fig. 11
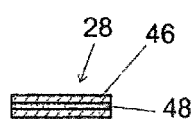
Fig. 12

US 9,090,284 B2

STEERING COLUMN FOR A MOTOR VEHICLE

CROSS REFERENCE TO RELATED APPLICATIONS

This application is a U.S. National Stage Entry of International Patent Application Serial Number PCT/EP2013/000431, filed Feb. 14, 2013, which claims priority to Austrian patent application no. AT A 285/2012, filed Mar. 6, 2012.

FIELD

The present disclosure relates to an adjustable steering column for a motor vehicle.

BACKGROUND

In the case of adjustable steering columns for motor vehicles, the steering spindle carrying the steering wheel and thus also the steering wheel can be adjusted relative to a mounting part by means of which the steering column can be secured on the body of the motor vehicle, this representing a comfort function of the steering column. Conventional adjustment options here are length adjustment and/or height or rake adjustment. In addition to adjustable steering columns, in which adjustment after opening a clamping mechanism is carried out manually, electrically adjustable steering columns are also known. With these, adjustment in the adjustment direction for length adjustment and/or in the adjustment direction for height or rake adjustment is accomplished in a motorized manner by means of at least one drive motor. In this case, a conventional embodiment envisages that the drive motor should be part of a spindle drive. Spindle drives, which are also referred to as worm gear screw mechanisms or screw link actuators, have a threaded spindle on the external thread of which a threaded nut is arranged in order to convert a rotary motion into a translational motion. Either the threaded nut is driven via appropriate mechanism elements by the drive motor, and the threaded spindle is adjusted axially by the rotation of the threaded nut, or the threaded spindle is driven and the spindle nut is adjusted axially by the rotation of the threaded spindle. The threaded nut or the threaded spindle is generally driven by means of a worm arranged on a motor shaft, which is in engagement with worm toothing arranged on the outer circumference of the spindle nut (in the case where the spindle nut is driven) or on the outer circumference of a gearwheel rigidly connected to the threaded spindle (in the case where the threaded spindle is driven).

An electrically adjustable steering column having a spindle drive is disclosed in DE 10 2007 039 361 A1, for example.

One general problem with electrically adjustable steering columns is that of reducing noise during adjustment. For this purpose, DE 10 2006 036 183 B4 proposes a belt drive, which separates the electric drive motor acoustically in terms of drive from the adjusting mechanism.

DE 10 2009 057 388 proposes a piezoelectrically driven active vibration damping system. Both technologies are very complex and expensive.

In the case of the electrically adjustable steering column known from EP 1 486 395 B1, a transmission part with a spherical head projecting into a cylindrical sleeve is provided on the axially adjustable spindle nut of the spindle drive. This sleeve is provided with an elastomeric lining, whereby noise reduction is also achieved. This technology is also complex since the guide by means of which the spindle nut transmits the motion to the adjustable steering column part has to be of very precise design in order to avoid rattling and jamming. The noise absorption achieved by means of the embodiment shown in this publication is also limited.

WO 2010/069434 A1 discloses embodiments of electrically adjustable steering columns, wherein, for the purpose of noise reduction, a housing part, in particular that of an electric drive motor, and/or a holding part is/are produced from a sheet embodied as composite material, wherein the composite material has a first metal layer and a second metal layer, between which a layer composed of a viscoelastic material or of an elastomer is arranged.

SUMMARY

Described herein is an adjustable steering column configured to provide noise absorption. In one aspect of the present disclosure, an embodiment of a steering column as disclosed herein can be adjusted in at least one adjustment direction, wherein, for the purpose of adjustment in the adjustment direction or in at least one of the adjustment directions, a spindle drive driven by a drive motor is provided, which spindle drive has a threaded spindle extending in an axial direction.

BRIEF DESCRIPTION OF THE DRAWINGS

The present disclosure is described in detail below with reference to the attached drawing figures, wherein:

FIG. 1 is a perspective view of an embodiment of a steering column of the present disclosure.

FIG. 2 is an alternate perspective view of the embodiment of the steering column of FIG. 1.

FIG. 3 is a bottom plan view of the embodiment of the steering column of FIG. 1.

FIG. 4 is a side view of the steering column of FIG. 3, taken in the view direction of arrow D in FIG. 3.

FIG. 5 is a detail section view of the steering column of FIG. 3, taken about section line AA in FIG. 3.

FIG. 6 is a perspective view of an embodiment of a spindle drive, for adjusting the height or rake of a steering column disclosed herein, and a pivoting damping unit connected thereto.

FIG. 7 is a perspective view of an embodiment of a pivoting damping unit of the present disclosure.

FIG. 8 is a side view of the steering column of FIG. 3, taken in the view direction of arrow E in FIG. 3.

FIG. 9 is a detail section view of the steering column of FIG. 3, taken about section line CC in FIG. 3.

FIG. 10 is a detail section view of the steering column of FIG. 8, taken about section line BB in FIG. 8.

FIG. 11 is a detail cross section view through an embodiment of an actuating lever of the present disclosure.

FIG. 12 is a detail cross section view through an embodiment of an lug of the present disclosure.

DETAILED DESCRIPTION

In the case of the steering column according to the invention, the steering column can be adjusted in at least one adjustment direction by means of a spindle drive driven by a drive motor, wherein the drive motor is connected to a load bearing part of the steering column via a damping unit. The damping unit comprises a primary connecting part, which has a first contact surface, and a secondary connecting part, which has a second contact surface. The first and the second contact surface are spaced apart from each other in the axial direction of the threaded spindle. An elastomeric or viscoelastic damping material is arranged between the first and the second contact surface and is in contact with the first and the second contact surface. When the damping device is acted upon by a force or force component which acts in the axial direction of the threaded spindle so as to bring the first and the second contact surface closer, the damping material arranged between the first and the second contact surface is subjected to pressure. When the damping material is subjected to pressure, however, the stiffness of the damping unit is advantageously higher (i.e. the force opposed to the first and the second contact surface approaching one another is higher) than when the damping material is subjected to shear (=shear loading), i.e. in the case of a force or force component acting so as to displace the primary connecting part relative to the secondary connecting part in a direction at right angles to the axial direction of the threaded spindle. Anisotropic system behavior is thereby achieved.

It is thus possible to keep down the vibration introduced into the steering column by the spindle drive, while the coupling of the spindle drive to the part of the steering column carrying the drive motor can nevertheless be of relatively stiff design. In other words, elastic decoupling of the spindle drive having the drive motor is achieved while simultaneously maintaining stiffness in the main direction of force (=axial direction of the threaded spindle). Maintaining stiffness in the main direction of force is of essential significance since otherwise adjustment and the driving feel of the driver would be affected in a disadvantageous way.

It is advantageous if one of the connecting parts, e.g. the primary connecting part, is connected directly or indirectly in a rigid or articulated joint to the drive motor, while the other of the connecting parts, e.g. the secondary connecting part, is connected directly or indirectly in a rigid or articulated joint to the part of the steering column carrying the drive motor.

The surface normals to the first and the second contact surface are preferably parallel to one another but oriented in opposite directions, wherein, in particular, the connecting parts each have a section in the form of a plate which is at right angles to the axial direction of the threaded spindle and has the respective contact surface.

It is advantageous if the damping material arranged between the first and the second contact surface has a layer in the form of a plate which is at right angles to the axial direction of the threaded spindle and the two side faces of which, which are spaced apart in the axial direction of the threaded spindle, rest against the first and second contact surface.

An advantageous embodiment of the invention envisages that the primary connecting part has a third contact surface, which faces in the opposite direction to the first contact surface, and the secondary connecting part has a fourth contact surface, which faces in the opposite direction to the second contact surface, wherein the third and the fourth contact surface are spaced apart from one another in the axial direction of the threaded spindle, and an elastomeric or viscoelastic damping material is arranged between the third and the fourth contact surface, said material being in contact with the third and fourth contact surface. When the damping device is acted upon by a force or force component which acts so as to cause relative displacement between the primary and the secondary connecting part in the axial direction of the threaded spindle, either the damping material arranged between the first and the second contact surface (in the case of the direction of force in one of the axial directions of the threaded spindle) or the damping material arranged between the third and the fourth contact surface (in the case of a direction of force in the other of the axial directions of the threaded spindle) is subjected to pressure.

It is advantageous if the damping material arranged between the third and the fourth contact surface has a layer in the form of a plate which is at right angles to the axial direction of the threaded spindle and the two side faces of which, which are spaced apart in the axial direction of the threaded spindle, rest against the third and the fourth contact surface. In this case, separate damping parts can be provided to form the damping material arranged between the first and the second contact surface and the damping material arranged between the third and the fourth contact surface. The layers arranged between the first and the second contact surface and between the third and the fourth contact surface could also be sections of a common damping part.

The damping material arranged between the third and the fourth contact surface is preferably formed by the same material as the damping material arranged between the first and the second contact surface.

It is advantageous if sections of the primary and secondary connecting part which are in the form of plates at right angles to the axial direction of the threaded spindle have the third and the fourth contact surface.

A preferred embodiment of the invention envisages that the primary connecting part has a U-shaped design, wherein the first and third contact surfaces are formed by the mutually facing surfaces of U legs of the primary connecting part, which are connected to one another by a base leg, and that the secondary connecting part projects into the interspace between the two U legs, wherein, in particular, the second and the fourth contact surface are formed by those surfaces of a web of the secondary connecting part projecting into the interspace between the two U legs which face away from one another.

However, while retaining substantially the same design, provision can be made in the case of certain applications to arrange some or all of the contact surfaces provided in the respective embodiment at a small angle to one another. Such angles are preferably less than 7° and, in the case of a deviation from 0°, the angle is particularly preferably at least 1°. In the application of this kind, the first contact surface is accordingly preferably arranged at an angle of less than 7° to the second contact surface and/or, in the case where these are present in the corresponding embodiment, the third contact surface is at an angle of less than 7° to the fourth contact surface. If it is not 0°, the slope angle here is preferably greater than 1°.

In the case where first, second, third and fourth contact surfaces are provided, it is likewise possible to envisage arranging only the first contact surface at an angle in a range of from 1° to 7° to the third contact surface. In the case where first, second, third and fourth contact surfaces are provided, it is likewise possible to envisage arranging only the second contact surface at an angle in a range of from 1° to 7° to the fourth contact surface. In the case where a primary connecting part with a substantially U-shaped configuration is provided, the slope is advantageously designed in such a way that the contact surfaces, as imagined on an enlarged scale, intersect on the side of the base leg facing away from the contact surfaces.

By means of such a slightly sloping arrangement, it is possible, on the one hand, to improve noise absorption through a better dispersion effect and, on the other hand, stiffness is only slightly reduced. This is particularly advantageous if the noise excitation spectrum of the electric motor includes a wide frequency range and/or a frequency range with a large number of noise components at frequencies below 100 Hz.

A damping unit according to the invention can be used in conjunction with the spindle drive for length adjustment and/or with the spindle drive for height or rake adjustment.

To allow height or rake adjustment, a steering column pivoting unit carrying the steering spindle can be pivoted relative to the mounting part, wherein pivoting is carried out by means of a spindle drive driven by a drive motor, and the drive motor is connected to the pivoting unit or the mounting part via a damping unit in the manner described above. Connection to the pivoting unit is preferred here. The spindle drive, the drive motor and the damping unit for height or rake adjustment are referred to below as the pivoting spindle drive, the pivoting drive motor and the pivoting damping unit.

To allow length adjustment of the steering column, a jacket unit rotatably supporting the steering spindle can be moved relative to the mounting part in the adjustment direction for length adjustment, wherein, if the steering column is also adjustable in height or rake, this ability for movement is preferably achieved by the jacket unit being supported by the pivoting unit in a manner which allows it to be moved in the adjustment direction for length adjustment. The length adjustment is accomplished by means of a spindle drive driven by a drive motor, wherein the drive motor is connected to the pivoting unit or the jacket unit or the mounting unit via a damping unit in the manner described above. Connection to the pivoting unit is preferred here. The spindle drive, the drive motor and the damping unit for length adjustment are referred to below as the translational spindle drive, the translational drive motor and the translational damping unit.

The pivoting of the pivoting unit relative to the mounting part is preferably accomplished by pivoting an actuating lever, on which the pivoting spindle drive engages and which is pivotably mounted on the pivoting unit and on the mounting part. In an advantageous embodiment of this actuating lever, provision is made for said lever to be produced from a sheet embodied as composite material, wherein the composite material has a first metal layer and a second metal layer, between which a third layer composed of an elastomeric or viscoelastic material is arranged. Vibration transmitted via this actuating lever, particularly in the form of structure borne noise, can thereby be damped.

In an advantageous aspect of the invention, which should also be regarded as independent, a steering column for a motor vehicle, which can be adjusted in at least one adjustment direction, wherein, for the purpose of adjustment in the adjustment direction or in at least one of the adjustment directions, a spindle drive driven by a drive motor is provided, which spindle drive has a threaded spindle extending in an axial direction, comprises at least one transmission element, which is connected, on the one hand, to the spindle drive or to one of the spindle drives, preferably pivotably, and, on the other hand, to an adjustable component of the steering column in order to transmit a movement of the spindle drive or of one of the spindle drives to the steering column component that can be adjusted in the adjustment direction or one of the adjustment directions. The transmission element is produced from a sheet embodied as composite material, wherein the composite material has a first metal layer and a second metal layer, between which a third layer composed of an elastomeric or viscoelastic material is arranged. A steering column of this kind can be combined with other features presented above, either individually or in combination.

In the case of a steering column which can be adjusted at least in height or rake as well, the transmission element mentioned above formed from the composite material described can be an actuating lever which is pivotably mounted on a mounting part, which can be secured on the body of the motor vehicle, and on a pivoting unit which can be pivoted relative to said mounting part for height or rake adjustment of the steering column.

In the case of a steering column that can be adjusted at least in length as well, the transmission element mentioned above formed from the composite material described can be a lug which is connected, preferably pivotably, to the component which can be adjusted in the adjustment direction for length adjustment, in particular to a jacket unit rotatably supporting the steering spindle.

A combination of height or rake adjustment and length adjustment is advantageously possible, wherein both said actuating lever and also said lug are formed from the composite material described above.

Further advantages and details of the invention are explained below with reference to the attached drawings.

An illustrative embodiment of a steering column according to the invention is shown in the figures. In the illustrative embodiment shown, the steering column is electrically adjustable both in the adjustment direction 1 for height or rake adjustment and also in the adjustment direction 2 for length adjustment.

The steering column comprises a steering spindle 4, which is rotatably supported by a jacket unit 3 (which could also be referred to as a jacket tube) and on which a steering wheel (not shown in the figures) can be mounted at a steering-wheel end 5. To allow length adjustment, the steering spindle 4 has two sections that can be telescoped relative to one another in a known manner. The steering spindle 4 is followed in the direction of the steering gear by further steering spindle sections, the connection being made by a universal joint 6 in each case.

To attach the steering column to the chassis of the motor vehicle, use is made of a rear mounting part 7 and a front mounting part 8. In the illustrative embodiment, the mounting parts 7, 8 are separate from one another and are mounted separately on the motor vehicle. A mutually connected embodiment is also conceivable and possible.

The jacket unit 3 is supported by a pivoting unit 9 in such a way that it can be moved in adjustment direction 2, which is parallel to the longitudinal axis 4a of the steering spindle 4. The pivoting unit 9 is connected to the front mounting part 8 in such a way that it can be pivoted about the pivoting axis 10, which is at right angles to the longitudinal axis 4a of the steering spindle 4 and is horizontal in the mounted state, and, as a result, is pivotable about the pivoting axis 10 relative to the front mounting part 8 and thus also relative to the rear mounting part 7.

It would also be conceivable and possible in principle for the pivoting axis of the pivoting unit 9 to be formed by the universal joint 6 (which is appropriately supported for this purpose). The front mounting part 8 could then also be omitted.

To pivot the pivoting unit 9 relative to the rear mounting part 7, use is made of an actuating lever 11, which is supported on the pivoting unit 9 in such a way that it can be pivoted about pivoting axis 12 and on the rear mounting part 7 in such a way that it can be pivoted about pivoting axis 13, wherein the pivoting axes 12, 13 are parallel to pivoting axis 10. During the pivoting of the actuating lever 11 about pivoting axis 13, the pivoting unit 9 is pivoted about pivoting axis 10. During this process, pivoting axis 10 can slide somewhat in adjustment direction 2 relative to the front mounting part 8 (by virtue of the arrangement of the pins forming said pivoting axis in slotted holes in mounting part 8). For length compensation, it is also possible for one of the other openings designed to provide rotatable support for the actuating lever 11 to be designed as a slotted hole.

The pivoting of the actuating lever 11 about pivoting axis 13 is accomplished by means of a pivoting spindle drive 14. This comprises an electric pivoting drive motor 15, which is connected to a threaded spindle 16 by means of mechanism elements, which are shown only in a highly schematized form or indicated by dashed lines in the sectional view in FIG. 5. A spindle nut 17 driven by the pivoting drive motor 15 is arranged on the external thread of the threaded spindle 16. Rotation of the spindle nut 17 moves the threaded spindle 16 in the axial direction thereof (=in the direction of the longitudinal axis thereof). The threaded spindle 16 is connected to the actuating lever 11 in such a way as to be pivotable about pivoting axis 18 parallel to pivoting axes 12, 13.

The spindle nut 17 is driven by means of a worm, which is arranged on the output shaft of the pivoting drive motor 15 and is in engagement with worm toothing around the outside of the spindle nut 17.

The pivoting drive motor 15 is connected to the pivoting unit 9 via a pivoting damping unit 20. For this purpose, a primary connecting part 21 of the pivoting damping unit 20 is connected to a bearing part 23 in such a way as to be pivotable about a pivoting axis parallel to pivoting axes 12, 13, 18, said bearing part supporting gearing components of the pivoting spindle drive 14 and being secured on the pivoting drive motor 15. The pivotable connection is accomplished by means of a pivoting part 25 rigidly connected to the primary connecting part 21. A secondary connecting part 22 of the pivoting damping unit 20 is furthermore secured on the pivoting unit 9 by means of connecting screws 24.

The primary connecting part 21 has a rigid U-shaped design with first and second legs 21a, 21b, which are connected to one another by a base leg 21c. The secondary connecting part 22 has a web 22a which projects into the interspace situated between the legs 21a, 21b. Rigidly connected to web 22a is a mounting web 22b, which has holes for the passage of the connecting screws 24.

The mutually facing surfaces of the first and second legs 21a, 21b form first and third contact surfaces 21d, 21e. Those surfaces of web 22a which face away from one another form second and fourth contact surfaces 22c, 22d. A damping material 26 is arranged between the first and the second contact surface 21d, 22c, which are spaced apart from one another in the axial direction of the threaded spindle 16 and thus have an interspace between them. A damping material 27 is arranged between the third and the fourth contact surface 21e, 22d, which are spaced apart in the axial direction of the threaded spindle 16 and thus have an interspace between them. Damping material 26 has a first side face, by means of which it rests against the first contact surface 21d, and a second side face, by means of which it rests against the second contact surface 22c. Damping material 27 has a first side face, by means of which it rests against the fourth contact surface 22d, and a second side face, by means of which it rests against the third contact surface 21e. The first side face of damping material 26 and the first side face of damping material 27 face in the same direction. The second side face of damping material 26 and the second side face of damping material 27 face in the same direction.

Damping material 26 and damping material 27 are preferably identical. Formation from an elastomer, especially rubber elastomer, is preferred. Formation from some other elastomeric material, including a thermoplastic elastomer for example, is also conceivable and possible. Formation from a viscoelastic material could furthermore be envisaged.

In the illustrative embodiment shown, the damping materials 26, 27 are formed by separate parts. Integral formation, wherein a connecting section consisting of damping material runs through the region between the base leg 21c and the free end of web 22a, is also conceivable and possible.

Since the damping material 26, 27 is advantageously substantially incompressible, the pivoting damping unit 20 is relatively stiff in relation to forces which act in the axial direction of the threaded spindle 16. In contrast, stiffness is significantly lower in relation to forces which act at right angles to the axial direction of the threaded spindle 16.

Since structure borne noise propagates along the path of highest rigidity, a vibration reducing design of the actuating lever 11 is advantageous. For this purpose, the actuating lever 11 consists of a composite material in the form of a multilayer, sandwich-type sheet, in which a layer composed of an elastomeric or a viscoelastic material is provided between two metal layers. It is possible, for example, for the materials mentioned in connection with the damping material 26, 27 to be used. The two metal top layers can be produced from steel or from a light alloy, preferably with wall thicknesses in a range of from 0.3 mm to 1 mm. The intermediate absorbing layer can have a thickness in a range of from 0.03 mm to 0.1 mm. This composite material can be in the form of sheets or strips and can be processed substantially in the same way as conventional steel sheet.

To move the jacket unit 3 relative to the pivoting unit 9 in order to carry out a length adjustment of the steering column, use is made of a translational spindle drive 34, which is driven by a translational drive motor 35. The translational spindle drive furthermore comprises a threaded spindle 36, on the external thread of which a spindle nut 49 driven by the translational drive motor is arranged. The spindle nut can be driven in the same way as that described in connection with the pivoting spindle drive 14. The threaded spindle 36 is pivotably connected to a lug 28, which is attached to the jacket unit 3 and projects out of the pivoting unit 9 through a slot 29 in said unit.

The translational drive motor 15 is connected to the pivoting unit 9 by means of a translational damping unit 40. Since, in the illustrative embodiment shown, the design of the translational damping unit 40 is substantially identical to the pivoting damping unit 20, the mutually corresponding parts are provided with the same reference signs and attention is drawn to the corresponding description of the pivoting damping unit 20. Here, the primary connecting part 21 is connected to the bearing part 43 of the translational spindle drive 34 by means of the pivoting part 45. Connecting screws 44 are used to connect the secondary connecting part 22 to the pivoting unit 9.

The lug 28 is preferably composed of a composite material in the form of a multilayer, sandwich-type sheet, in which a layer composed of an elastomeric or a viscoelastic material is provided between two metal layers. The fundamental construction and materials can be the same as for the actuating lever 11.

Other parts too can be formed from a composite material of this kind, e.g. the housing of the pivoting drive motor 15 and/or of the translational drive motor 35.

The respective damping material 26, 27 of the pivoting damping unit 20 and of the translational damping unit 40 is connected to the respective connecting part 21, 22 by compression and/or vulcanization and/or adhesive bonding. Pin joints provided by pins 30 formed, in particular, from plastic can be provided as a redundant means of fixing. A redundant positive fixing against being pulled out is thereby ensured but this fixing transmits only a slight amount of vibration. This additional pin joint serves, in particular, to secure the connection even under very high loads, such as those which can occur in the event of a crash, for example.

Given sufficient flexibility of threaded spindle 16, the primary connecting part 21 could also be connected rigidly to bearing part 23.

Given sufficient flexibility of threaded spindle 36 and/or sufficiently accurate guidance of the jacket unit 3 relative to the pivoting unit 9, the secondary connecting part 22 could also be connected rigidly to bearing part 43.

In a modified embodiment of the invention, provision could also be made for height or rake adjustment and/or for length adjustment by turning the threaded spindle by means of the respective drive motor 15, 35 and thereby axially adjusting the spindle nut arranged on the threaded spindle.

Embodiments with fewer or more contact surfaces on the primary and the secondary connecting part, between which a damping material 26, 27 is arranged in each case, are conceivable and possible.

The pivoting spindle drive 14 and thus the pivoting drive motor 15 could also be mounted on a mounting part fixed to the vehicle, e.g. mounting part 7, by means of the pivoting damping unit 20.

The translational spindle drive 34 and thus the translational drive motor 35 could also be attached to the jacket unit 3 by means of the translational damping unit 40. Attachment to a mounting part fixed to the vehicle, e.g. the rear mounting part 7, is also conceivable and possible.

Where feasible, all features described in individual embodiments of the invention can be combined freely with one another without exceeding the scope of the invention.

The invention claimed is:

1. An adjustable steering column for a motor vehicle, comprising:
   a jacket unit;
   a steering spindle disposed within said jacket unit and configured to rotate within said jacket unit about a longitudinal axis of said steering spindle to control a steering direction of the motor vehicle;
   a pivoting unit configured to be pivotably coupled to a frame of the motor vehicle and support said jacket unit;
   a spindle drive configured to adjust at least one of a position or length of said steering spindle in at least one adjustment direction, said spindle drive including a threaded spindle extending in an axial direction;
   a drive motor configured to drive said spindle drive; and
   a damping unit configured to couple said pivoting unit to said drive motor and reduce vibrations translated there between, said damping unit comprising,
      a primary connecting part having a first contact surface,
      a secondary connecting part having a second contact surface that is spaced apart from said first contact surface in direction parallel to said longitudinal axis of said steering spindle, and
      a damping pad disposed between said first and second contact surfaces of said respective primary and secondary connecting parts.

2. The adjustable steering column of claim 1, wherein surface normals to said first contact surface and said second contact surface of said respective primary and secondary connecting parts are parallel to the axial direction of said threaded spindle.

3. The adjustable steering column of claim 1, wherein said primary and secondary connecting parts each include a plate portion oriented perpendicular to the axial direction of said threaded spindle, and which plate portions respectively include said first and second contact surfaces.

4. The adjustable steering column of claim 1, wherein said damping pad is a flat plate of at least one of an elastomeric or viscoelastic material having respective front and back faces, which respectively rest against said first and second contact surfaces of said primary and secondary connecting parts, and which are perpendicular to the axial direction of said threaded spindle.

5. The adjustable steering column of claim 1, wherein said primary contacting part further includes a third contact surface that faces in an opposite direction to that of said first contact surface, and said secondary connecting part further includes a fourth contact surface that faces in the opposite direction to that of said second contact surface, wherein said third and fourth contact surfaces are spaced apart from one another in the axial direction of said threaded spindle, and wherein a damping pad is disposed between said third and fourth contact surfaces.

6. The adjustable steering column of claim 5, wherein said damping pad is a flat plate of at least one of an elastomeric or viscoelastic material having respective front and back faces, which respectively rest against said third and fourth contact surfaces of said primary and secondary connecting parts, and which are perpendicular to the axial direction of said threaded spindle.

7. The adjustable steering column of claim 5, wherein the primary connecting part includes a U-shaped portion having a base leg connected to each of a first leg and a second leg, which first and second legs are spaced apart from each other in the axial direction of said threaded spindle and have a space defined there between, wherein said first and third contact surfaces are inner opposing surfaces of said first leg and said second leg of said U-shaped portion, and wherein said secondary connecting part includes a web disposed in said space defined between said first and second legs of said U-shaped portion of said primary connecting part.

8. The adjustable steering column of claim 7, wherein said second and fourth contact surfaces are non-facing surfaces on opposite sides of said web of said secondary connecting part that is disposed in said space defined between said first and second legs of said U-shaped portion of said primary connecting part.

9. The adjustable steering column of claim 1, further comprising a vehicle mounting part pivotably coupled to said pivoting unit about a pivot axis defined therebetween, said vehicle mounting part configured to be coupled to a frame of the motor vehicle, wherein said pivoting unit is configured to be pivoted about said pivot axis by said spindle drive, so as to adjust a height or rake of said steering spindle.

10. The adjustable steering column of claim 9, further comprising an actuating lever pivotably coupled between each of said mounting part and said pivoting unit, and further coupled to said spindle drive, said actuating lever being configured to be driven by said spindle drive so as to pivot said pivoting unit relative to said mounting part to make a height or rake adjustment to a steering wheel end of said steering spindle.

11. The adjustable steering column of claim 10, wherein said actuating lever comprises a first metal layer and a second metal layer, between which first and second layers is disposed a third layer of at least one of an elastomeric or viscoelastic material.

12. The adjustable steering column of claim 9, wherein said damping unit is pivotably connected to a bearing part of said spindle drive and configured to make a height or rake adjustment to said steering spindle, said bearing part carrying said drive motor for height or rake adjustment.

13. The adjustable steering column of claim 9, wherein said jacket unit is supported by said pivoting unit so as to permit said jacket unit to be moveable about the adjustment direction for length adjustment of said steering spindle.

14. The adjustable steering column of claim 13, wherein said damping unit is pivotably coupled to a bearing part of said spindle drive to permit length adjustment of said steering spindle, said bearing part configured to carry said drive motor.

15. The adjustable steering column of claim 1, further comprising a vehicle mounting part configured to be coupled to a frame of the motor vehicle, wherein said damping unit is configured to be coupled between said drive motor of said drive unit and at least one of said pivoting unit, said jacket unit, or said vehicle mounting part.

16. The adjustable steering column of claim 15, wherein said jacket unit rotatably supports said steering spindle, and is configured to permit said drive motor of said spindle drive to move said jacket unit, relative to said vehicle mounting part, in a length adjustment direction so as to adjust the length of said steering spindle.

\* \* \* \* \*